(12) United States Patent
Bedekar et al.

(10) Patent No.: US 9,344,934 B2
(45) Date of Patent: May 17, 2016

(54) METHOD AND APPARATUS FOR REDUCING LATENCY DURING WIRELESS CONNECTIVITY CHANGES

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram OV, Trivandrum (IN)

(73) Assignee: Google Technology Holdings LLC, Mountain View, CA (US)

( * ) Notice: Subject to any disclaimer, the term of this patent is extended or adjusted under 35 U.S.C. 154(b) by 1241 days.

(21) Appl. No.: 11/913,936

(22) PCT Filed: Jun. 19, 2006

(86) PCT No.: PCT/US2006/023730
§ 371 (c)(1),
(2), (4) Date: Nov. 9, 2007

(87) PCT Pub. No.: WO2007/001952
PCT Pub. Date: Jan. 4, 2007

(65) Prior Publication Data
US 2008/0167037 A1 Jul. 10, 2008

(30) Foreign Application Priority Data

Jun. 21, 2005 (IN) .............................. 533/KOL/2005

(51) Int. Cl.
| | | |
|---|---|---|
| H04W 4/00 | (2009.01) | |
| H04W 36/02 | (2009.01) | |
| H04W 80/04 | (2009.01) | |
| H04W 60/00 | (2009.01) | |
| H04W 80/00 | (2009.01) | |
| H04W 36/00 | (2009.01) | |
| H04W 92/20 | (2009.01) | |

(52) U.S. Cl.
CPC ............ *H04W 36/02* (2013.01); *H04W 36/005* (2013.01); *H04W 36/0016* (2013.01);*H04W60/00* (2013.01); *H04W 60/005* (2013.01); *H04W 80/00* (2013.01); *H04W 80/04* (2013.01); *H04W 92/20* (2013.01)

(58) Field of Classification Search
CPC ... H04W 80/04; H04W 60/00; H04W 60/005; H04W 80/00; H04W 36/005; H04W 8/08; H04W 36/0016; H04W 88/182; H04W 88/08; H04W 8/04; H04W 36/08; H04W 48/18; H04W 4/06; H04W 8/26; H04W 80/045; H04W 12/06; H04W 76/022; H04W 8/06; H04W 36/0083; H04W 48/16; H04W 48/20; H04W 4/02; H04W 88/06; H04M 15/8214; H04M 15/8228; H04L 65/1006
USPC ........ 455/435.1, 435.2, 436, 433, 445, 432.1, 455/517, 422.1, 453, 502; 370/338, 331; 709/230, 238, 223, 228, 232; 380/270
See application file for complete search history.

(56) References Cited

U.S. PATENT DOCUMENTS

| | | |
|---|---|---|
| 5,506,838 A | 4/1996 | Flanagan |
| 6,195,555 B1 | 2/2001 | Dent |
| 6,230,012 B1 | 5/2001 | Willkie et al. |
| 6,285,880 B1 | 9/2001 | Gagnon et al. |
| 6,430,698 B1 | 8/2002 | Khalil et al. |
| 6,473,413 B1 | 10/2002 | Chiou et al. |
| 6,567,664 B1 | 5/2003 | Bergenwall et al. |
| 6,701,361 B1 * | 3/2004 | Meier ........................... 709/224 |
| 6,711,408 B1 | 3/2004 | Raith |
| 6,721,565 B1 | 4/2004 | Ejzak et al. |
| 6,795,857 B1 | 9/2004 | Leung et al. |
| 6,795,891 B2 | 9/2004 | Lin |
| 6,859,653 B1 | 2/2005 | Ayoub et al. |
| 6,977,938 B2 | 12/2005 | Alriksson et al. |
| 7,016,682 B2 | 3/2006 | Won et al. |
| 7,096,273 B1 | 8/2006 | Meier |
| 7,139,833 B2 | 11/2006 | Heller |
| 7,289,463 B2 | 10/2007 | Ozugur |
| 7,336,670 B1 | 2/2008 | Calhoun et al. |
| 7,349,380 B2 | 3/2008 | Barker, Jr. et al. |
| 7,450,544 B2 | 11/2008 | Rue |
| 7,512,687 B2 | 3/2009 | Jung |
| 7,649,866 B2 | 1/2010 | Chari et al. |

| | | | |
|---|---|---|---|
| 7,733,829 B2 | 6/2010 | Lee et al. | |
| 7,860,067 B2 | 12/2010 | Na et al. | |
| 2001/0024443 A1 | 9/2001 | Alriksson et al. | |
| 2002/0015396 A1 | 2/2002 | Jung | |
| 2002/0034166 A1 | 3/2002 | Barany et al. | |
| 2002/0057657 A1 | 5/2002 | La Porta et al. | |
| 2002/0075844 A1 | 6/2002 | Hagen | |
| 2002/0090940 A1 | 7/2002 | Chen et al. | |
| 2002/0094813 A1* | 7/2002 | Koshimizu et al. | 455/436 |
| 2003/0016655 A1 | 1/2003 | Gwon | |
| 2003/0018810 A1 | 1/2003 | Karagiannis et al. | |
| 2003/0076837 A1 | 4/2003 | Whitehill et al. | |
| 2003/0104813 A1 | 6/2003 | Julka et al. | |
| 2003/0148777 A1 | 8/2003 | Watanabe et al. | |
| 2003/0174709 A1 | 9/2003 | Shankar | |
| 2003/0202505 A1 | 10/2003 | Ozugur | |
| 2003/0235176 A1 | 12/2003 | Zhang et al. | |
| 2004/0005884 A1 | 1/2004 | Nieminen et al. | |
| 2004/0022212 A1 | 2/2004 | Chowdhury et al. | |
| 2004/0023653 A1 | 2/2004 | O'Neill | |
| 2004/0034705 A1 | 2/2004 | Focsaneanu | |
| 2004/0043791 A1 | 3/2004 | Reddy | |
| 2004/0063455 A1 | 4/2004 | Eran et al. | |
| 2004/0066760 A1 | 4/2004 | Thubert et al. | |
| 2004/0071109 A1 | 4/2004 | Herle et al. | |
| 2004/0082330 A1 | 4/2004 | Marin | |
| 2004/0114559 A1 | 6/2004 | Wang | |
| 2004/0133684 A1 | 7/2004 | Chan et al. | |
| 2004/0185852 A1* | 9/2004 | Son et al. | 455/438 |
| 2004/0213181 A1 | 10/2004 | Grech et al. | |
| 2004/0213260 A1 | 10/2004 | Leung et al. | |
| 2004/0242233 A1 | 12/2004 | Lutgen | |
| 2005/0047399 A1 | 3/2005 | Lee et al. | |
| 2005/0088994 A1 | 4/2005 | Maenpaa et al. | |
| 2005/0113091 A1 | 5/2005 | Rodriguez et al. | |
| 2005/0122946 A1 | 6/2005 | Won | |
| 2005/0128975 A1 | 6/2005 | Kobayashi et al. | |
| 2005/0135422 A1 | 6/2005 | Yeh | |
| 2005/0148368 A1* | 7/2005 | Scheinert et al. | 455/561 |
| 2005/0163080 A1 | 7/2005 | Suh et al. | |
| 2005/0180372 A1 | 8/2005 | Cho et al. | |
| 2005/0185632 A1 | 8/2005 | Draves, Jr. et al. | |
| 2005/0213546 A1 | 9/2005 | Reitter et al. | |
| 2006/0104247 A1 | 5/2006 | Dommety et al. | |
| 2006/0112183 A1 | 5/2006 | Corson et al. | |
| 2006/0142034 A1 | 6/2006 | Wentink et al. | |
| 2007/0115883 A1* | 5/2007 | Narayanan et al. | 370/331 |

FOREIGN PATENT DOCUMENTS

| | | |
|---|---|---|
| EP | 0777396 A1 | 6/1997 |
| EP | 1404143 A2 | 3/2004 |
| EP | 1263182 B1 | 12/2008 |
| WO | 0045560 | 8/2000 |
| WO | 03049377 A1 | 6/2003 |
| WO | 2004073324 A2 | 8/2004 |
| WO | 2004073325 A2 | 8/2004 |

OTHER PUBLICATIONS

Chuah, M.C. et al.: Mobile Virtual Private Dial-up Services:, Bell Labs Technical Journal; Bell Laboratories; U.S., vol. 4, No. 3, Jul. 1999, pp. 51-72.

Wikipedia Article from Internet: "Global System for Mobile Communications", Apr. 17, 2005, http://web.archive.org/web/20050417021658/http://de.wikipedia.org/wiki/Global_System_for_Mobile_Communications, Mar. 27, 2008, pp. 1-13.

Perkins, Charles et al: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002-Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ietf-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

German Patent and Trademark Office, Summons before the German Patent and Trademark Office for German Patent Application No. 10 2006 001 710.1 (related to above-captioned patent application), mailed Jan. 28, 2016.

Venken, Kristiaan et al., "Analysis of the evolution to an IP-based UMTS terrestrial radio access network," Wireless Communications, IEEE, Oct. 2003, 10th issue, No. 5, p. 46-53.

De Vriendt, J. et al., "Mobile network evolution: A revolution on the move," IEEE Communications Magazine, Apr. 2002.

* cited by examiner

*Primary Examiner* — Fred Casca

(74) *Attorney, Agent, or Firm* — Faegre Baker Daniels LLP

(57) ABSTRACT

A wireless access point (102) detects an indicia of a change in wireless connectivity of a mobile station (101) with respect to itself and another wireless access point (103). The wireless access point then automatically effects at least one of establishing a communication between itself and the second wireless access point regarding the change in wireless connectivity and/or establishing a temporary data tunnel as between itself and the second wireless access point. These network elements can also act to automatically establish a data flow path for the mobile station as between the second wireless access point and a network element (such as a mobility management agent (105)) that is external to the common subnet. In a preferred approach this comprises, at least in part, automatically sending a registration request to the network element other than in response to a specific request from the mobile station to send such a registration request.

20 Claims, 5 Drawing Sheets

METHOD AND APPARATUS FOR REDUCING LATENCY DURING WIRELESS CONNECTIVITY CHANGES

RELATED APPLICATIONS

This application relates to the following patent applications as were filed on even date herewith (wherein the contents of such patent applications are incorporated herein by this reference):

Method and apparatus to facilitate communications using surrogate and care-of internet protocol addresses PCT/US06/23726;

Address resolution protocol-based wireless access point method and apparatus PCT/US06/23727;

Method and apparatus to facilitate mobile station communications using internet protocol-based communications PCT/US06/23732;

Method, apparatus, and system for establishing a direct route between agents of a sender node and a receiver node PCT/US06/23731;

System and method for providing a distributed virtual mobility agent PCT/US06/23729; and System and method for paging and location update in a network PCT/US06/23728.

TECHNICAL FIELD

This invention relates generally to communication systems and more particularly to communication systems that support wireless mobility and changes with respect to corresponding wireless connectivity.

BACKGROUND

One-way and two-way wireless communications are a relatively well-understood area of endeavor. In many cases, various network elements comprise an infrastructure that support the communications needs of one or more mobile stations. These communications needs can comprise voice calls, data communications, and so forth. In many cases, modern communications networks comprise a large number of geographically differentiated wireless access points that essentially define the network's edge. Such geographic differentiation, in turn, facilitates significant reuse of various network resources such as radio frequency bearer channels, control channels, time slots, spreading codes, and so forth. Aggressive reuse of such resources then facilitates viably supporting a relatively large user population.

Such communication networks often serve to support the communication needs of mobile users as those mobile users move with respect to the communication system infrastructure. This, however, gives rise to a need to support various mobility management functions such as, but not limited to:
  Connected mode mobility (for example, handover of a presently communicating mobile station from one wireless access point to another);
  Idle mode mobility (for example, supporting and effecting location updates for and/or paging of supported mobile stations);
  Subscriber and call session management (for example, authentication, authorization, and accounting services, policy administration, and so forth);
  Radio frequency resource management (for example, resource scheduling, admission control, dynamic quality of service management, load balancing, and so forth);
to name but a few.

There are various problems and concerns that arise when supporting such mobility management capabilities. For example, latency in various forms presents numerous concerns. To illustrate, data can be lost or delayed due to the time required to fully effect a handover from one wireless access point to another. This, in turn, can necessitate resending data and/or simply accepting a loss of some data under such circumstances.

BRIEF DESCRIPTION OF THE DRAWINGS

The above needs are at least partially met through provision of the method and apparatus for reducing latency during wireless connectivity changes described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, upon detecting indicia of a change in wireless connectivity as corresponds to a given mobile station with respect to a first wireless access point and a second wireless access point, one automatically effects at least one communication between the first and second wireless access points regarding this change in wireless connectivity and/or automatically establishes a temporary data tunnel as between the first and second wireless access points. In a preferred approach, one also then automatically establishes a data flow path for the mobile station as between the second wireless access point and a network element that is hierarchically differentiated from the second wireless access point. The latter approach preferably comprises, at least in part, automatically sending a registration request from the second wireless access point to the network element other than in response to a specific request from the mobile station to send such a registration request.

So configured, a variety of system architectural capabilities and/or limitations are readily accommodated while generally tending to minimize or avoid latency-related delays or loss of data packets as may otherwise occur as a result of a change in wireless connectivity. Furthermore, as will be made more clear below, this approach can readily accommodate various operational scenarios. These teachings are generally applicable without requiring change to existing mobile stations and can be employed with mobile stations that are Internet Protocol incapable as well as Internet Protocol capable platforms.

Figure 1:
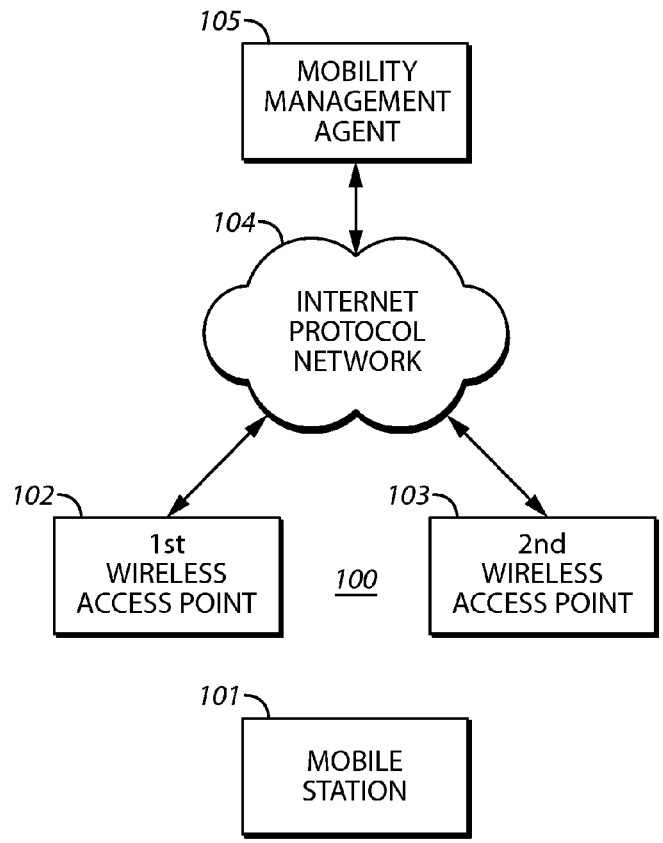
FIG. 1 comprises a block diagram as configured in accordance with various embodiments of the invention.

These and other benefits may become clearer upon making a thorough review and study of the following detailed description. Referring now to the drawings, and in particular to FIG. 1, for the purposes of providing a useful instructional and exemplary context, a communication system 100 that supports the wireless communication needs of a corresponding mobile station 101 comprises a first and second wireless access point 102 and 103 that each operably couple to a local Internet Protocol network 104 (such as, but not limited to, an IPv4 or IPv6-based network) as will be well understood by those skilled in the art. A mobility management agent 105 also operably couples to the Internet Protocol network 104 and may comprise, for example, a Home Agent as is known in the art.

Those skilled in the art will understand and recognize that a typical communication system will comprise a considerably larger number of wireless access points as well as other network elements. A typical communication system will also typically exhibit greater hierarchical depth. As these teachings are not particularly sensitive to such attributes (and in fact are readily scalable to accommodate such factors when present), such additional context is not presented here for the sake of clarity.

Figure 2:
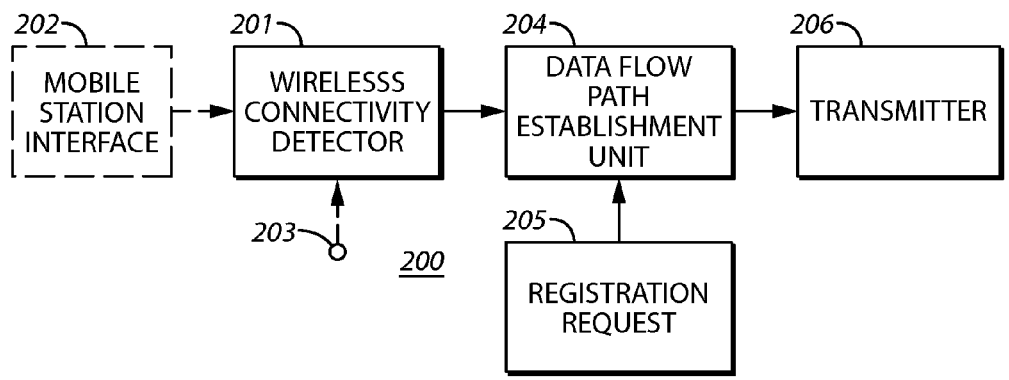
FIG. 2 comprises a block diagram as configured in accordance with various embodiments of the invention.

So configured, the mobile station 101 can source and/or receive data packets of various kinds (including packets in support of both real time and non-real time services) via a wireless access point to which it has become attached. With reference to FIG. 2, an illustrative wireless access point 200 in accord with these teachings will preferably comprise, in relevant part, a change in wireless connectivity detector 201 that is responsive to indicia of a change in wireless connectivity of a mobile station with respect to another wireless access point (at least when that other wireless access point comprises a part of the local subnet). The specific indicia so employed can vary with the needs and/or capabilities of a given application setting and will also likely vary with the specific wireless connectivity aspect at issue.

For example, when the point of wireless connectivity comprises a handover (for example, from this wireless access point 200 to another), the indicia can comprise corresponding handover information as may be received via a mobile station interface 202 (such as a base station as is known in the art) that communicates directly with the mobile station and/or another source 203 (such as information obtained via a peer-to-peer exchange with another wireless access point via the local subnet). Depending also on the needs of a given application setting and/or a particular operational goal or desire, this wireless connectivity detector 201 can detect such a change in wireless connectivity prior to completion of the change in wireless connectivity and/or subsequent to completion of the change in wireless connectivity. Both approaches have potential use and benefit as will be demonstrated below in more detail.

In a preferred approach the change in wireless connectivity detector 201 also operably couples to a data flow path establishment unit 204. The latter is preferably configured and arranged to be responsive to a change in wireless connectivity by automatically establishing a data flow path for the mobile station as between the wireless access point and the aforementioned other wireless access point (via, for example, the inter-network interconnecting them). As will be shown below, this data flow path can be used to reduce or even eliminate at least some latency delays with respect to data packet forwarding.

To aid the data flow path establishment unit 204 establish such a data flow path between peer wireless access points, the data flow path establishment unit 204 will preferably have access to a registration request 205 module and a transmitter 206 (which may comprise a part of a transceiver in a preferred approach). This transmitter 206 is preferably configured and arranged to transmit a registration request to a network element (such as the previously mentioned mobility management agent described with reference to FIG. 1). In a preferred embodiment, this capability is exercised in a gratuitous manner; i.e., this registration request is sent other than in response to a specific request from the mobile station to send such a registration request. Application of this capability will be described below.

The illustration provided will be understood to comprise a logical depiction. The elements portrayed can comprise physically separate elements if desired or can share a common enabling platform. The latter may be particularly desirable when the enabling platform comprises a partially or wholly programmable platform as versus a fixed-purpose apparatus.

Figure 3:
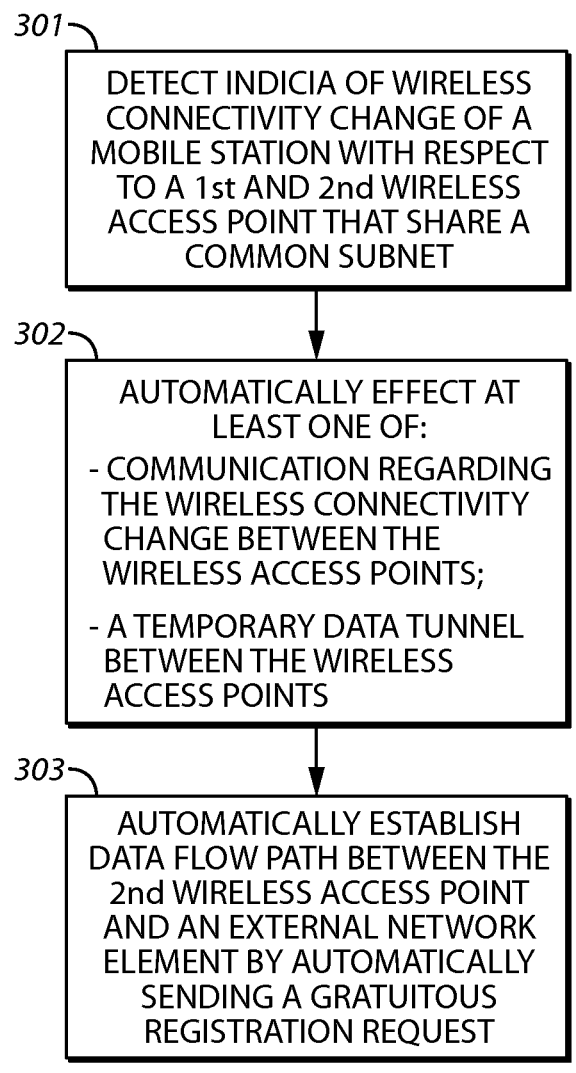
FIG. 3 comprises a flow diagram as configured in accordance with various embodiments of the invention.

So configured, a wireless access point is sufficiently well appointed to permit support and facilitation of the process 300 described in FIG. 3. Pursuant to this process 300, upon detecting 301 indicia of a change in wireless connectivity of a mobile station with respect to a first and second wireless access point, one automatically effects 302 at least one (and in some cases, both) of these two actions:

effecting at least one communication between the first and second wireless access points regarding the change in wireless connectivity (such as, for example, information regarding the initiation and/or completion of a handover from one to the other, their mutual identities, registration request prompts, and so forth); and effecting establishment of a temporary data tunnel as between the first and second wireless access points (to support, as will be shown below, the forwarding of data packets as may have been received at the handing-over wireless access point subsequent to initiation of a handover but prior to establishment of a new data tunnel that again couples the mobile station to the primary data source via the handed-over wireless access point).

This process 300 also preferably automatically establishes 303 a data flow path for the mobile station as between the second wireless access point and a network element that is hierarchically differentiated from the second access point. By one preferred approach, this comprises, at least in part, automatically sending a registration request from the second wireless access point to the network element other than in response to a specific request from the mobile station to send the registration request. For example, such a registration request can be sent in response to reception by the second wireless access point of a specific message as transmitted by the first wireless access point. As will be shown below, these teachings are compatible with various approaches in this regard and specifically accommodate sending such a registration request prior to completion of the change in wireless connectivity and further support establishing this data flow path prior to completion of the change in wireless connectivity.

Figure 4:
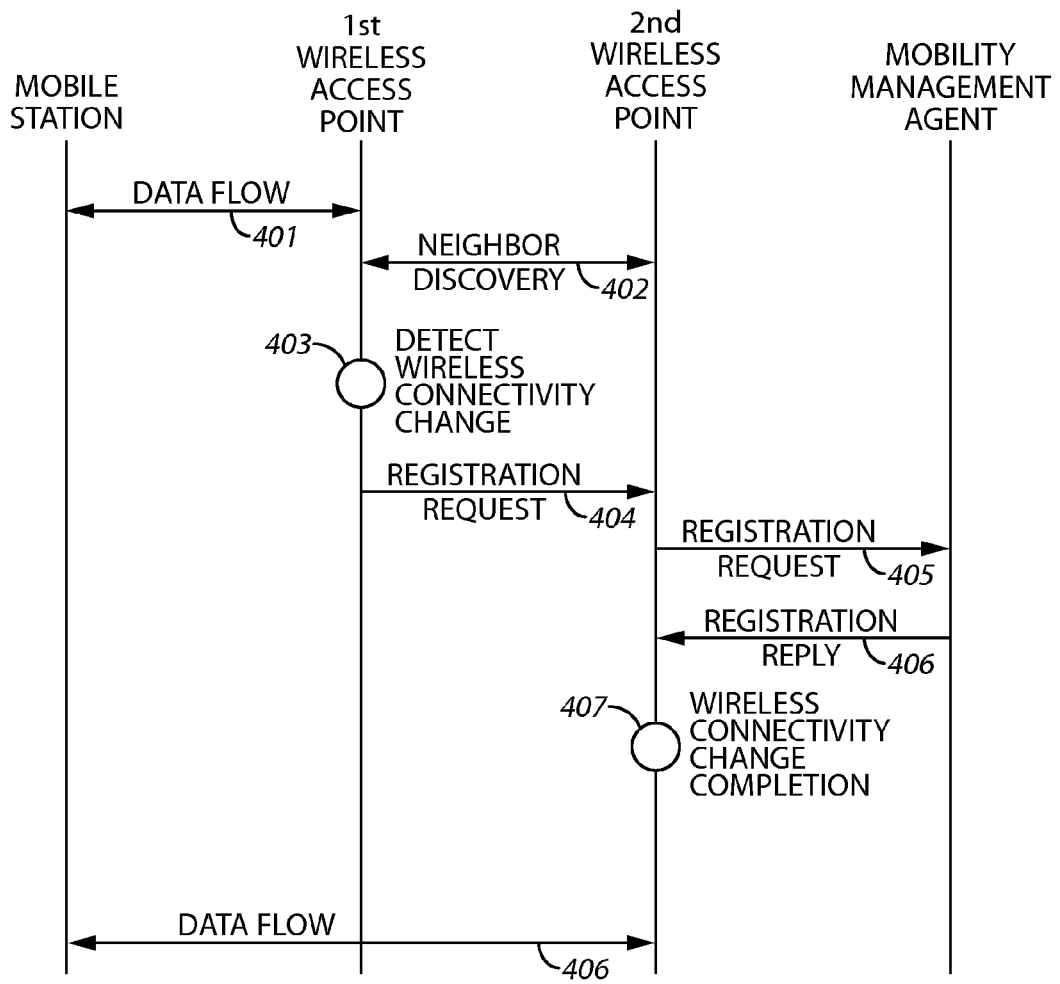
FIG. 4 comprises a signal flow diagram as configured in accordance with various embodiments of the invention.

Referring now to FIG. 4, a first illustrative example of these teachings as employed in a specific scenario will be provided. In this scenario, a mobile station, attached to a first wireless access point, benefits from an already-established data flow 401 as has been previously established between these elements. This first wireless access point is also aware of a second wireless access point (and vice versa) via a neighbor discovery process 402 as has been conducted via the subnet that is common to both wireless access points (as neighbor discovery procedures are well known in the art and as these teachings are not particularly sensitive to which particular procedure is employed, further elaboration and description regarding such a procedure will not be provided here for the sake of brevity and the preservation of narrative focus).

In this scenario the first wireless access point detects 403 a particular wireless connectivity change of interest (such as, for example, the beginning of a handover of the mobile station from the first wireless access point to the second wireless access point). Upon detecting this indicia, the first wireless access point, via the common subnet, contacts the second wireless access point and provides a registration request 404. In a preferred approach this registration request includes information that identifies the mobile station though this may not always be useful and/or necessary when the indicia of wireless connectivity change itself comprises a notice from the second wireless access point based upon the mobile station having attached itself to the second wireless access point. This registration request can comprise any registration request as will suffice in a given setting and may comprise, for example, a Mobile Internet Protocol registration request.

The second wireless access point, upon receiving this registration request, reacts by automatically transmitting a registration request 405 to a mobility management agent such as a home agent for the mobile station. (This registration request can comprise, for example, a Mobile Internet Protocol registration request.) This registration request 405 will serve to permit the mobility management agent to properly route future data packets intended for the mobile station to the second wireless access point. In a preferred approach the mobility management agent responds with a registration reply 406.

Eventually, the wireless connectivity change is complete 407. The second wireless access point is now able to establish a data flow path 408 to the mobile station to permit the continued transmission of data packets to the mobile station from an external source (not shown) relatively sooner than might ordinarily be expected. This reduction in latency is owing primarily, in this scenario, to the early registration effected by the second wireless access point on behalf of the mobile station prior to the mobile station having completed its wireless connectivity event (in this example, the hand over to the second wireless access point).

Figure 5:
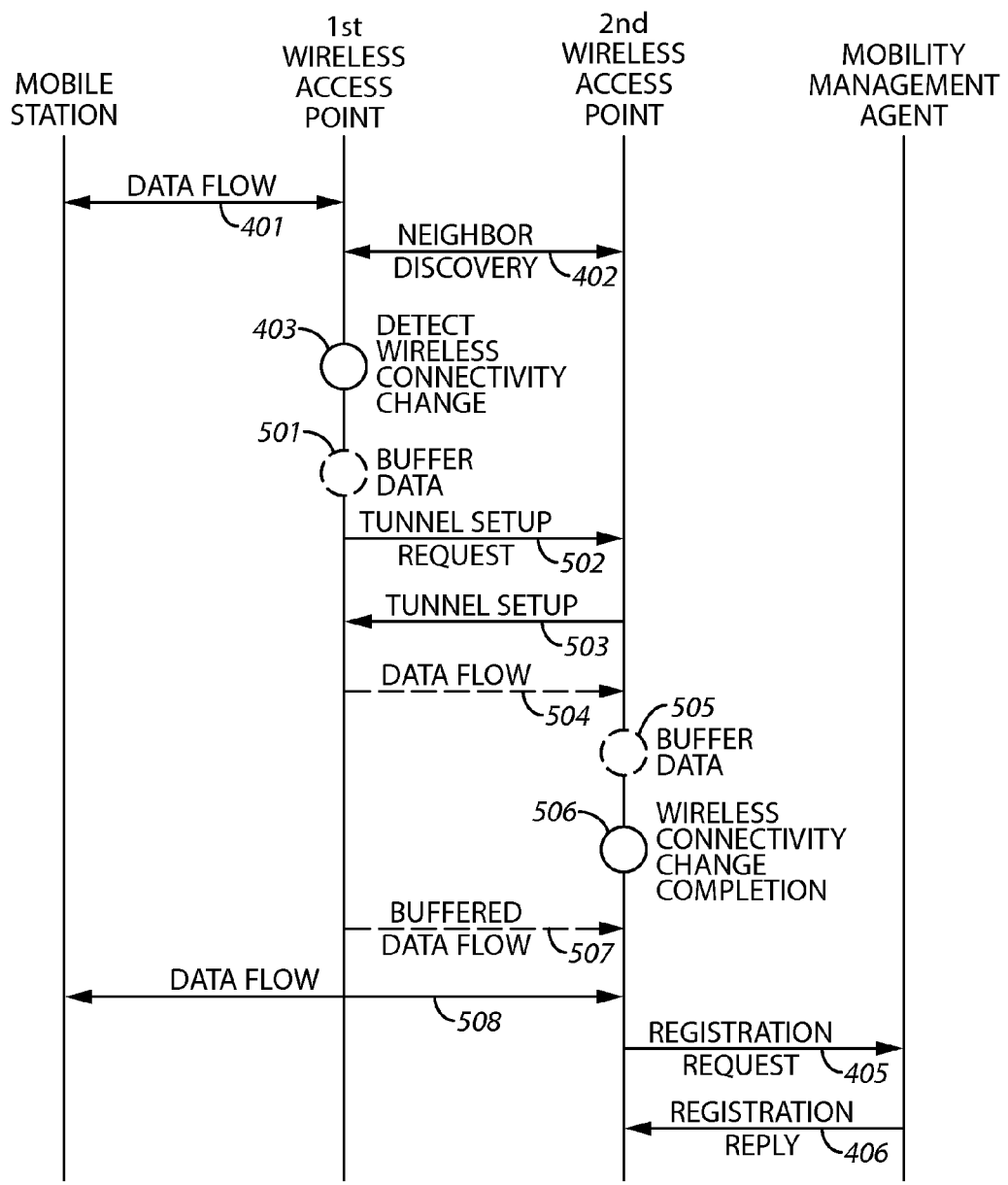
FIG. 5 comprises a signal flow diagram as configured in accordance with various embodiments of the invention.

Referring now to FIG. 5, a second scenario illustrative of the flexibility and capabilities of the present teachings will be presented. Here, as with the first example presented above, the mobile station is already attached to the first wireless access point, the first and second wireless access points are aware of one another via a neighbor discovery process 402, and the first wireless access point has detected 403 indicia of a wireless connectivity change.

In this scenario, if desired, the first wireless access point can optionally begin to buffer data 501 that the wireless access point now receives to forward to the mobile station. Various buffering techniques are well-understood in the art and require no further elaboration here. Regardless of whether the first wireless access point supports such buffering, the first wireless access point now transmits a tunnel setup request 502 to the second wireless access point via a peer-to-peer communication using the subnet to which these elements belong. Upon receiving this request, the second wireless access point responds with a tunnel setup response 503. (Of course, in some cases it may be that a tunnel or other data path already exists between the first and second wireless access points. When this occurs it would not be necessary to establish the described path and the existing path could be used instead if so desired.) (If desired, and prior to establishing this data flow path, a communication can be sent from the first wireless access point to the second wireless access point to inform the latter of the detection of wireless connectivity change indicia 403 and to facilitate a transfer of one or more kinds of context as may relate, for example, to the mobile station (such as the mobile station's Internet Protocol address and the like). Following this, the data forwarding path could then be set up.)

By one approach, and particularly so when the first wireless access point is not buffering any data via the optional actions noted above, the first wireless access point can begin to transmit a data flow 504 to the second wireless access point. This data flow 504 can comprise, for example, data packets that are intended for the mobile station. Since the mobile station has not yet completed its handover at this point in the scenario, the second wireless access point will preferably buffer 505 such data to render that data available for transmission to the mobile station when next possible.

As before, eventually the wireless connectivity change is complete and the second wireless access point detects 506 that status. In scenarios where the first wireless access point has not already begun to forward its buffered mobile station data to the second wireless access point, a buffered data flow 507 from the former to the latter can be established now.

Regardless of whether the data was earlier sent to the second wireless access point and buffered upon arrival, or is only now being provided to the second wireless access point following buffering at the first wireless access point (or some combination of both approaches), a data flow 508 can now be established between the second wireless access point and the mobile station. The second wireless access point can also transmit a registration request 405 to the mobility management agent (and receive a corresponding registration reply 406) prior to, following, or in the absence of an exchange of registration messages (or even earlier) as between the second wireless access point and the mobile station (as may depend upon the capabilities of the mobile station itself and/or relative timing of these events).

So configured, it will be appreciated that latency with respect to the delivery of data packets received shortly before, during, and/or shortly after the change in wireless connectively event will likely be reduced. It will also be seen that these teachings can aid minimize the need to retransmit packets that were otherwise lost during the transition window. And it will again be seen that these teachings permit an earlier establishment of a data flow path between the mobile station and the handed-over wireless access point than might be possible in the absence of these teachings.

Figure 6:
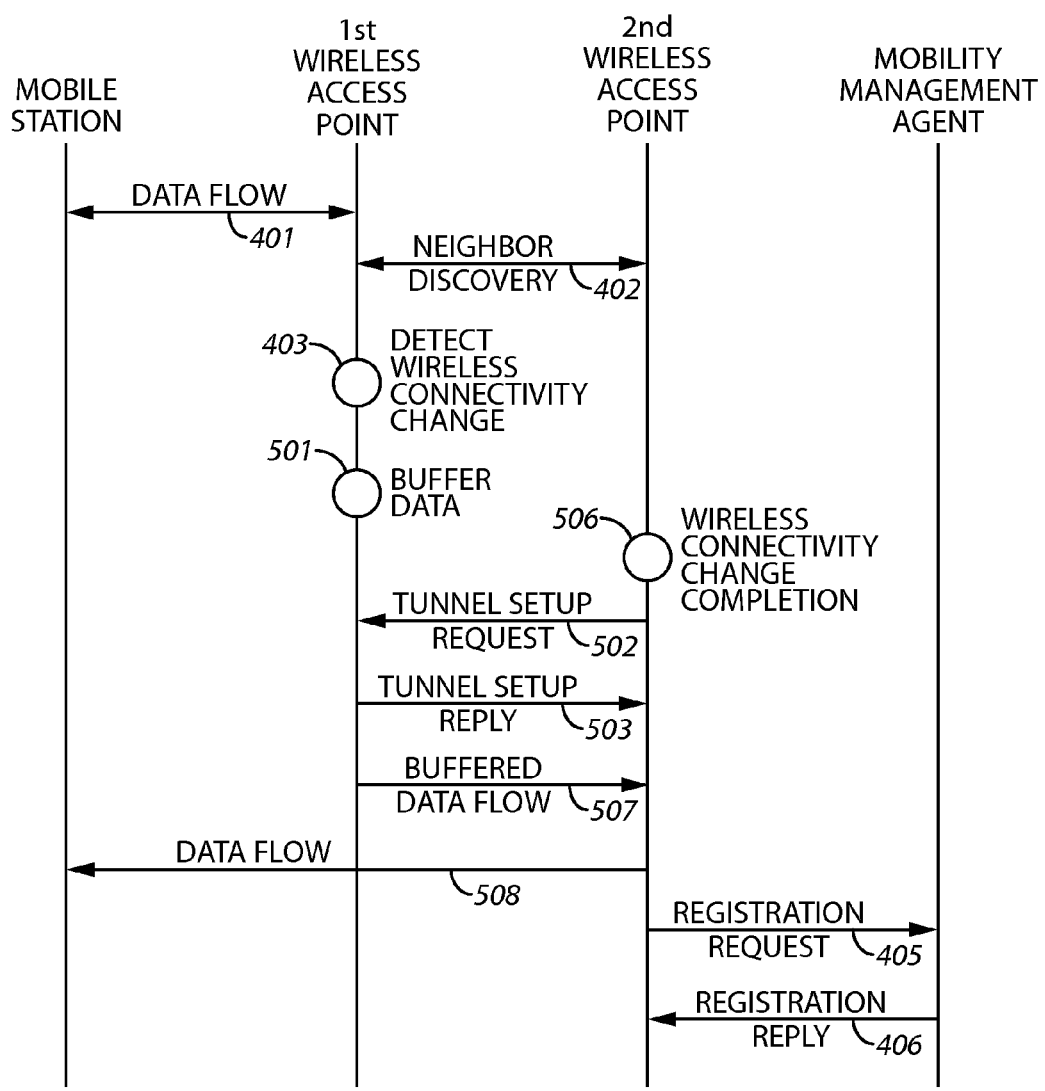
FIG. 6 comprises a signal flow diagram as configured in accordance with various embodiments of the invention.

Referring now to FIG. 6, a third scenario will be presented. In this scenario, upon detecting indicia of a wireless connectivity change 403, the first wireless access point begins to buffer data 501 destined ultimately for the mobile station. At such time as the second wireless access point detects completion of the change of wireless connectivity event 506, the second wireless access point transmits a tunnel setup request 502 to the first wireless access point. The latter preferably responds with a tunnel set up reply 503 and a buffered data flow 507 from the first wireless access point to the second wireless access point results. (As was mentioned above, it would also be possible here to optionally provide additional context information from the first wireless access point to the second wireless access point (for example, prior to setting up the tunnel and/or facilitating the flow of buffered data) as relates to the mobile station.) The second wireless access point, in turn, is then able to forward that data to the mobile station via a corresponding data flow 508.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for effecting a handover of a data flow for a mobile station from a first wireless access point to a second wireless access point, the method comprising:
    detecting, by a processor, indicia of a change in wireless connectivity of the mobile station with respect to the first wireless access point and the second wireless access point, wherein the first wireless access point and the second wireless access point share a common subnet and wherein the change in wireless connectivity is associated with a handover of the data flow for the mobile station to the second wireless access point from the first wireless access point;
    establishing a temporary data tunnel between the first and second wireless access point; and
    automatically establishing a path for the data flow for the mobile station between the second wireless access point and a network element that is hierarchically differentiated from the second wireless access point, wherein automatically establishing comprises, at least in part, automatically sending a registration request from the second wireless access point to the network element other than in response to a specific request from the mobile station to send the registration request, wherein automatically sending the registration request from the second wireless access point to the network element comprises automatically sending, prior to completion of the change in wireless connectivity, the registration request from the second wireless access point to the network element in response to a specific message having been received by the second wireless access point as transmitted by the first wireless access point.

2. The method of claim 1 wherein detecting indicia of a change in wireless connectivity comprises detecting indicia of a change in wireless connectivity prior to completion of the change in wireless connectivity.

3. The method of claim 2 wherein automatically sending a registration request from the second wireless access point to the network element comprises automatically sending a registration request from the second wireless access point to the network element in response to a specific message having been received by the second wireless access point as transmitted by the first wireless access point.

4. The method of claim 3 wherein automatically sending a registration request from the second wireless access point to the network element further comprises automatically sending the registration request prior to completion of the change in wireless connectivity.

5. The method of claim 4 wherein automatically establishing a data flow path further comprises automatically establishing the data flow path prior to completion of the change in wireless connectivity.

6. The method of claim 2 wherein the establishing of a temporary data tunnel between the first and second wireless access point comprises automatically establishing a temporary data flow path between the first wireless access point and the second wireless access point in response to detection of the indicia of the change in wireless connectivity.

7. The method of claim 6 wherein automatically establishing a temporary data flow path further comprises transporting at least some data as transmitted by the network element and as intended for the mobile station from the first wireless access point to the second wireless access point using the temporary data flow path.

8. The method of claim 6 wherein automatically sending a registration request from the second wireless access point to the network element comprises automatically sending the registration request from the second wireless access point to the network element subsequent to completion of the change in wireless connectivity.

9. The method of claim 7 wherein automatically establishing a temporary data flow path further comprises buffering at least some of the data at the second wireless access point to provide buffered data.

10. The method of claim 9 wherein automatically establishing a temporary data flow path further comprises transmitting at least some of the buffered data to the mobile station subsequent to completion of the change in wireless connectivity.

11. The method of claim 9 wherein automatically establishing a temporary data flow path further comprises automatically discarding at least some of the data in response to detection of at least one predetermined discard criteria.

12. The method of claim 2 wherein:
    establishment of a temporary data tunnel between the first and second wireless access point
    comprises automatically establishing a temporary data flow path between the first wireless access point and the second wireless access point prior to completion of the change in wireless connectivity.

13. The method of claim 12 wherein establishing a data flow path further comprises automatically initiating establishment of the data flow path prior to completion of the change in wireless connectivity.

14. The method of claim 1 wherein detecting indicia of a handover comprises detecting indicia of a handover subsequent to completion of the handover.

15. The method of claim 14 wherein automatically sending a registration request from the second wireless access point to the network element comprises automatically sending the registration request from the second wireless access point to the network element subsequent to completion of the change in wireless connectivity and in the absence of a specific registration request from the mobile station.

16. The method of claim 15 wherein the establishing of a temporary data tunnel between the first and second wireless access point further comprises transporting at least some data as transmitted by the network element and as intended for the mobile station from the first wireless access point to the second wireless access point using a temporary data flow path between the first wireless access point and the second wireless access point.

17. The method of claim 15 wherein transporting at least some data as transmitted by the network element and as intended for the mobile station from the first wireless access point to the second wireless access point using a temporary data flow path further comprises:
acquiring at the second wireless access point identifying information for the first wireless access point;
using the identifying information to facilitate establishing the temporary data flow path.

18. A wireless access point for use in a communication network comprising a local subnet that comprises a plurality of wireless access points, the wireless access point comprising:
a change in wireless connectivity detector responsive to indicia of a change in wireless connectivity of a mobile station with respect to another wireless access point, wherein the another wireless access point comprises a part of the local subnet and wherein the change in wireless connectivity is associated with a handover of a data flow for the mobile station to the wireless access point from the another wireless access point;
a data flow path establishment unit that is responsive to the change in wireless connectivity detector wherein the data flow path establishment unit is configured and arranged to:
establish a temporary data tunnel between the wireless access point and the another wireless access point; and
automatically establish a path for the data flow for the mobile station between the wireless access point and the another wireless access point;
a registration request module; and
a transmitter operably coupled to the registration request module and being configured and arranged to transmit, as part of the handover of the data flow to the wireless access point from the another wireless access point, a registration request to a network element that is external to the local subnet other than in response to a specific request from the mobile station to send the registration request, wherein transmitting the registration request to the network element comprises automatically transmitting, prior to completion of the change in wireless connectivity, the registration request to the network element in response to a specific message having been received by the wireless access point as transmitted by the another wireless access point.

19. The wireless access point of claim 18 wherein the change in wireless connectivity detector comprises means for at least one of:
detecting the change in wireless connectivity prior to completion of the change in wireless connectivity;
detecting the change in wireless connectivity subsequent to completion of the change in wireless connectivity.

20. The wireless access point of claim 18 wherein the transmitter comprises means for providing the registration request to the network element without specific instructions from the mobile station in this regard to facilitate establishing a data path between the network element and the mobile station via the wireless access point when the wireless access point receives the handed over mobile station whose wireless connectivity has changed.

\* \* \* \* \*